UNITED STATES PATENT OFFICE.

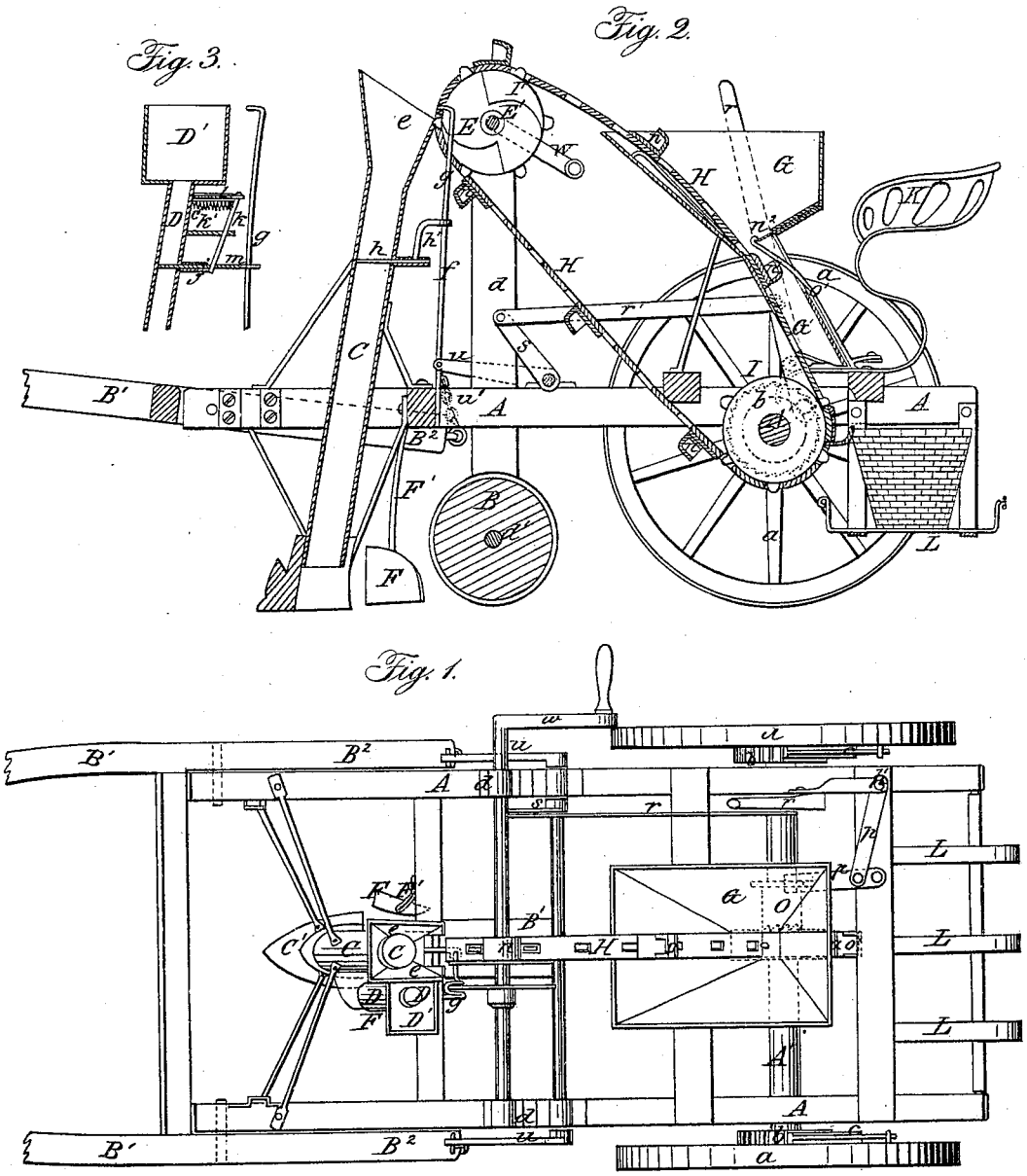

GEORGE RAY, OF KINDERHOOK, NEW YORK.

IMPROVEMENT IN PLANTING-MACHINES.

Specification forming part of Letters Patent No. 59,071, dated October 23, 1866.

*To all whom it may concern:*

Be it known that I, GEORGE RAY, of Kinderhook, in the county of Columbia and State of New York, have invented certain new and useful Improvements in Planting-Machines; and I do hereby declare that the following is a full, clear, and exact description of the same, reference being had to the accompanying drawings, making part of this specification, in which—

Figure 1 is a plan view of a seeding-machine constructed according to my invention. Fig. 2 is a central vertical longitudinal section of the same.

Similar letters of reference indicate corresponding parts in both figures.

This invention relates to that class of seed-planters in which the seed is dropped and covered in hills at any suitable or desired distance apart; and it consists in a novel construction of a planting-machine, whereby it is enabled not only to plant corn, beans, and the like, but also with equal facility to plant potatoes, and whereby fertilizers may, if desired, be deposited in the hill with the seed, and, furthermore, whereby the machine is rendered very efficient in its operation and very easily managed by the person using it.

To enable others to understand the construction and operation of my machine, I will proceed to describe it with reference to the drawings.

The main frame of the machine is shown at A, and is supported at its rearmost end upon a rotating axle, A', which is furnished at each extremity with a driving-wheel, $a$, and also with a ratchet-wheel, $b$, the said ratchet-wheels being placed close to the inner sides of the driving-wheels $a$, and acted upon by pawls $c$, attached to the said wheels, in such manner that when the machine is drawn forward the driving-wheels will rotate the axle A', at the same time that either of the said driving-wheels may be turned backward, as required in turning the machine around. The frame A is furnished, near its forward end, with two upright bars, $d$, the lower ends of which extend below the frame A, and have bearings formed in them, which support the transverse shaft $d'$ of a caster-wheel, B, the circumference of which is made somewhat concave, and which not only serves to support the forward end of the frame A, but also as a roller to press down the soil or earth upon the seed when placed in the ground, as will be hereinafter fully set forth.

Pivoted to the forward extremity of the frame A is a suitable draft-pole, or a pair of thills, $B^1$, by which the machine is drawn; and projecting back from the pole or thills, as the case may be, and one upon each side of the forward portion of the frame A, is a bar, $B^2$.

Situated in the forward end of the frame A, and retained in proper position by suitable braces, is a nearly upright tubular seeding-stock, C, the upper end of which is made enlarged or flaring, as shown at $e$, and to the lower end of which is attached a double share, C'. The seed, in dropping to the ground, passes through this stock; and situated at one side of the said stock C is a supplementary tubular-stock, D, upon the upper end of which is formed a hopper, D', and the lower end of which enters the lowermost portion of the stock C. The office of this stock D is to conduct any desired quantity of a suitable fertilizer to the hill while the seed is being dropped therein.

Projecting upward from the frame A, behind the tubular stocks C D, are two elastic rods, $f$ and $g$, which are united at their upper ends, and which receive a vibrating motion from a cam-wheel, E, which is secured upon a transverse shaft, E', which works in bearings formed upon the upper ends of the bars $d$. The seeding-stock C is provided with a transverse or horizontal slide, $h$, which works in suitable guides, and is connected by a short arm, $h'$, with the elastic rod $f$, by which it is operated, to regulate the descent of the seed through the said seeding-stock, as will be hereinafter set forth.

The supplementary stock D is provided with two similar slides, marked, respectively, $i$ and $j$, (shown in Fig. 3,) and connected one with each end of the short bar $k$, the center of which is pivoted in a short spur, $k'$, fixed upon the rear of the said stock D. A short spiral spring, $l$, tends to push the upper end of this bar $k$ outward, and consequently to force the slide $i$ outward also, while the lower slide, $j$, is forced inward by the lower portion of the bar $k$.

A short notched arm, $m$, extends from the slide $j$ back and behind the elastic bar $g$, in such manner that when the said bar is moved back it draws the lower slide $j$ outward, and, of course, at the same time forces inward the upper slide, $i$.

F represents two covering-shares, which are situated one a little in rear of each side of the double share C', and which are secured upon the lower ends of bars or hangers F', which extend downward from the forward part of the frame A.

The hopper, in which the seed to be planted is placed, is shown at $g$, and is supported by suitable braces, and furnished with an inclined tubular standard, G' which is secured upon the rearmost end of the frame A, and has its upper end communicating with the interior of the hopper G, with its lower end left open to allow one side of an endless carrying-belt, H, to pass through the said standard and through the hopper G, as shown more clearly in Fig. 2, the said endless belt extending from a spurred wheel, I, situated upon the axle A', to a similar spurred wheel, I', secured upon the shaft E', the said belt being perforated with holes, into which the spurs of the said wheels I I' fit as the belt passes over them, and thus insures the proper movement of the belt, the said belt being situated in line with the seeding-stock C, and furnished with buckets or cups $n$ in such manner that, the belt being moved by the rotation of the axle A', the said cups are filled by passing through the seed in the hopper G, and empty their contents into the flaring upper end, $e$, of the seeding-stock C as they are tilted or turned in passing over the spurred wheel I'.

Situated at the upper end of the tubular standard G, at the rearmost side thereof, is a transverse slide, $n^2$, the forward end of which is attached to the upper end of a broad curved spring, $o'$, in such manner as to yield or move back to allow the cups $n$ to pass upward into the hopper G, and to be pressed forward by the said spring after the upward passage of each cup, so as to prevent the seed in the hopper from falling down into the tubular standard G'. A clutch is shown in dotted lines at $o$ in Fig. 1, by means of which the spurred wheel I is rotated by the axle A' when the machine is in operation, while, by disconnecting the said clutch from the wheel I, the axle is allowed to turn freely within the same, so that the machine may be drawn along without operating the said spurred wheel I and the parts moved thereby. The clutch $o$ is connected, by a horizontal bent lever, $p$, and a link, $p'$, with an upright lever, $r$, in such manner that when the said lever is moved back the clutch $o$ will be moved out of gear with the spurred wheel I, and vice versa.

The lever $r$ is connected by a rod, $r'$, with an arm, $s$, which is secured upon one end of a transverse rock-shaft, $s'$, situated toward the forward portion of the frame A, the said rock-shaft being furnished at each end with a forwardly-projecting arm or lever, $u$, the extremities of which are connected by short chains, $u'$, with the rear ends of the bars $B^2$ in such a way that when the lever $r$ is moved back the forward portion of the frame A is raised up so as to bring the caster-wheel B clear of the ground, at the same time that the clutch is brought away from the wheel I, as hereinbefore explained. K indicates the driver's seat, situated at the rear end of the machine, as shown in Fig. 2.

Suspended below the rearmost end of the frame A is horizontal platform, L, upon which may be placed baskets, as shown in red color in Fig. 2, the said baskets containing a supply of seed potatoes, corn, or beans, as the case may be, and the position of the platform with reference to the seat K and to the hopper G being such that the baskets thereon may be easily reached by the driver when seated in the seat K, and their contents emptied into the hopper G.

The draft horse or horses by which the machine is drawn are guided in the usual manner by the driver seated in the seat K, as just mentioned. The hopper G being filled with seed and the clutch $o$ being brought into gear with the spurred wheel I, the endless carrying-belt is operated so that its upper portion, passing through the hopper G, causes the cups attached to the said belt to fill themselves as they are drawn upward through the mass of seed in the said hopper, the said cups emptying their contents into the seeding-stock C as they are turned over in passing over the spurred wheel I', as hereinbefore explained. The seed thus placed in the said seeding-stock falls upon the slide $h$, and remains thereon until the cam E allows the elasticity of the rods $f$ to force the said slide $h$ outward, and thus permit the seed to fall down through the seeding-stock into the furrow formed by the double share C, the seed being then covered by the covering-shares F as the machine is drawn along, and the soil or earth being pressed down upon it by the subsequent passage over it of the caster or roller B. The cups $n$ are made of a greater or less size, according to the size or variety of the seed to be planted and the frequency of the movements of the slide $h$, and the distance apart of the cups upon the endless carrying-belt being proportioned to the distance apart at which it is desired to plant the seed.

The hopper D' of the supplementary tubular stock D is filled with guano, gypsum, or other suitable fertilizing material, and previous to the dropping of the seed into the seeding-stock, as just explained, the upper slide, $i$, is moved outward by the backward movement of the elastic rod $g$, and, of course, the lower slide, $j$, worked by the opposite end of the lever $k$, is moved inward, so that a proper quantity of the fertilizing material is allowed to fall upon the said lower slide; and when the slide $h$ is drawn out to permit the seed to fall into the furrow the upper slide, $i$, is moved inward to shut off the descent of the fertilizing material from the hopper, while that already upon the lower slide $j$ is dropped by the outward movement of the said slide, and is descending through the supplementary stock D into the lower end of the seeding-stock, and thence into the furrow with the seed dropped at the same time by the aforesaid seeding-stock, the seed and the fertilizing material being thus simultaneously placed in the hill.

When it is desired to draw the machine from place to place without operating the same, the the lever $r$ is pushed back, which not only throws the clutch $o$ out of gear, but also, by raising the front end of the frame A, brings the shares C' and F, together with the caster B, clear of the ground, so that the weight of the machine rests entirely upon the wheels $a$, with the axle A' turning within the spurred wheel I. Furthermore, the shaft E' is furnished at one end with a crank, $w$, so that the said shaft may be turned by hand to empty the contents of the foremost filled cup $n$ into the seeding-stock C, and to cause the descent thereof through the said stock to the ground, as is frequently required in dropping the seed for the first hill of a row, when it is desired that the hills shall be planted in rows both ways.

What I claim as my invention, and desire to secure by Letters Patent, is—

1. The slide $n^2$, arranged in relation with the cups $n^1$ of the carrier-belt H, and with the hopper G and tubular standard G', substantially as herein set forth, for the purpose specified.

2. The slide $h$ and elastic rod $f$, arranged in relation with each other and with the cam E, tubular seeding-stock C, and carrier-belt H, substantially as herein set forth, for the purpose specified.

3. The supplementary tubular stock D, furnished with two slides, $i$ $j$, and so arranged and operated in relation with the seeding-stock C as to be capable of dropping a fertilizing material into the hills simultaneously with the dropping of the seed, substantially as herein set forth.

4. The platform L, arranged below the rearmost end of the frame A, and in relation with the seat K and hopper G, substantially as herein set forth, for the purpose specified.

5. The bent lever $p$, link $p'$, lever $r$, rod $r'$, and arms $s$ and $u$ of the transverse shaft $s'$, so arranged in relation with each other and with the clutch $o$ and the bars $B^2$ of the thills or draft-pole that the clutch $o$ will be thrown out of gear with the seed-conducting mechanism simultaneously with the raising of the forward end of the frame A, substantially as herein set forth, for the purpose specified.

GEORGE RAY.

Witnesses:
  H. DENNIS,
  JOHN A. VAN BRAMER.